No. 739,841. PATENTED SEPT. 29, 1903.
L. DELIVOUK & F. J. GEORGE.
MACHINE FOR CUTTING AND FORMING BINDING STRIPS.
APPLICATION FILED FEB. 9, 1903.
NO MODEL. 3 SHEETS—SHEET 1.
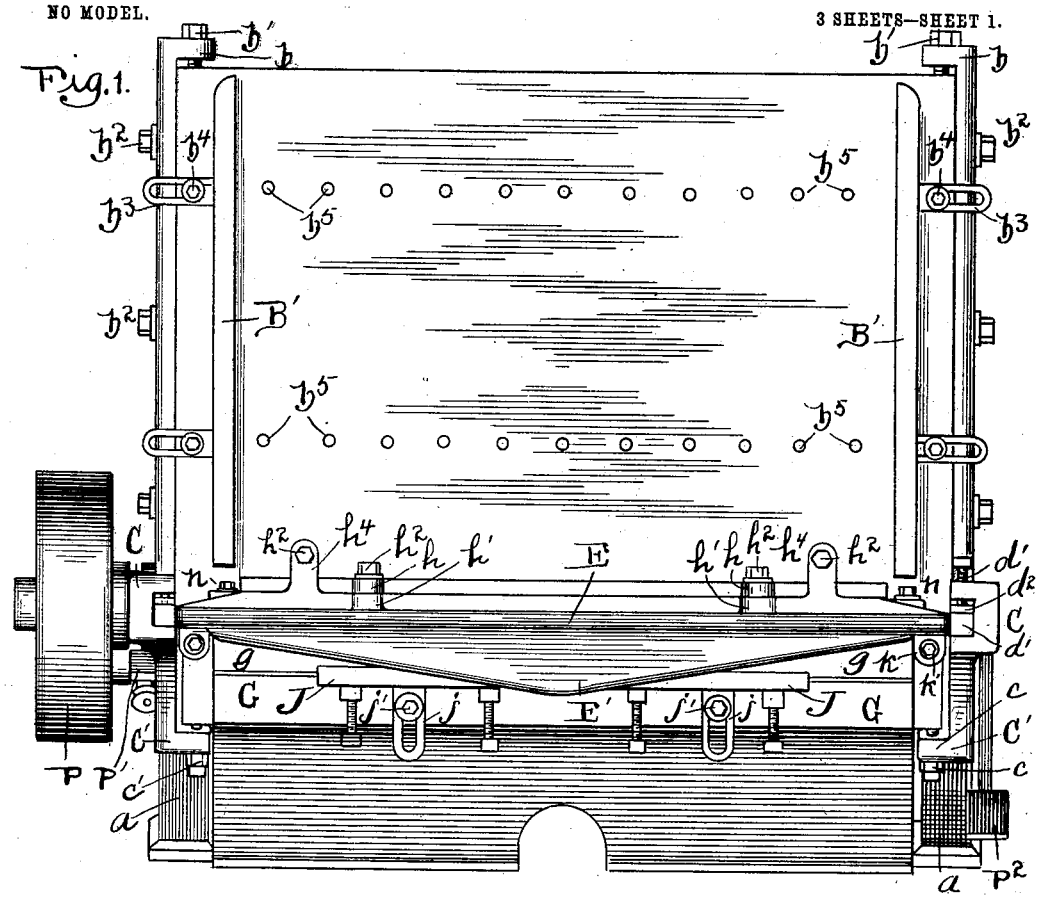
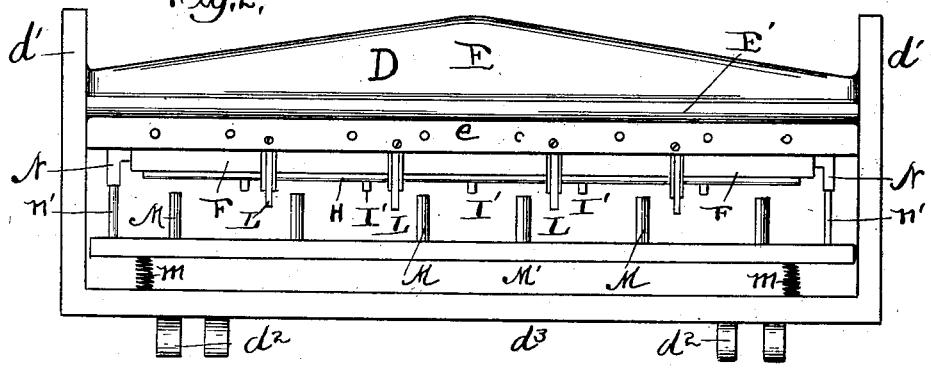
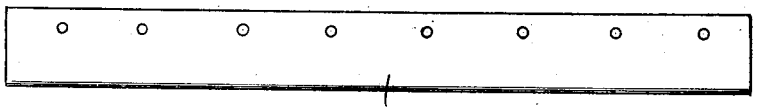

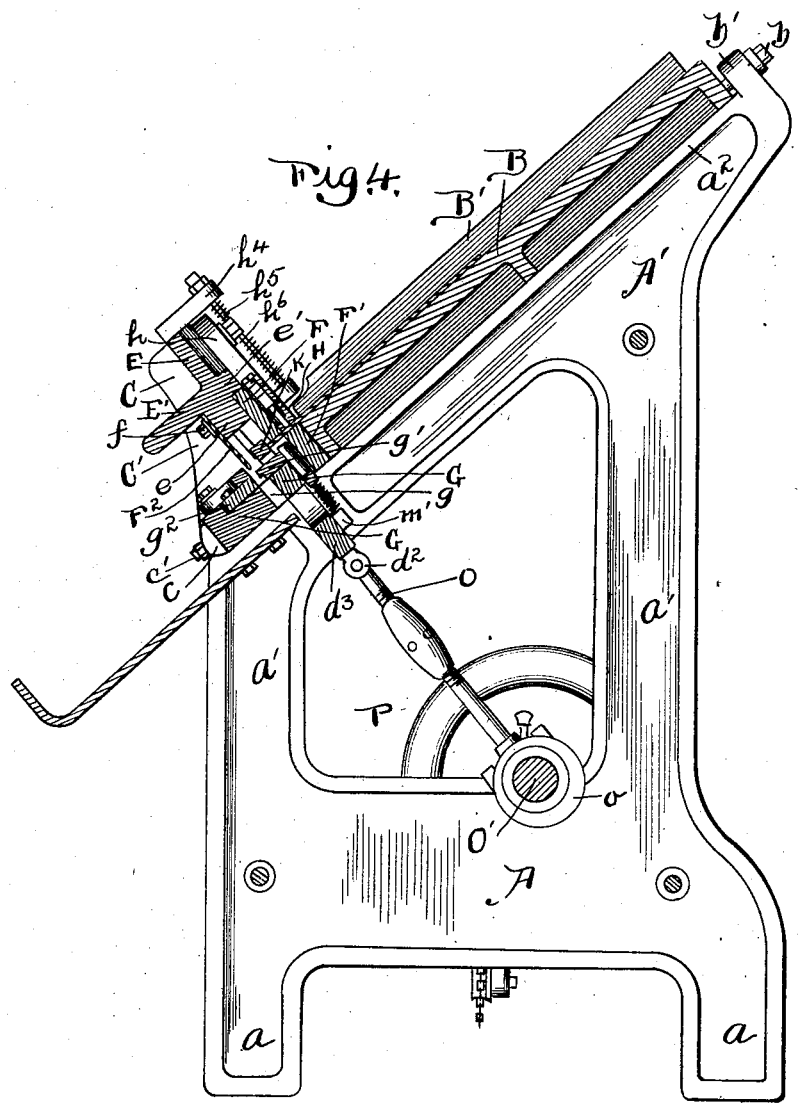

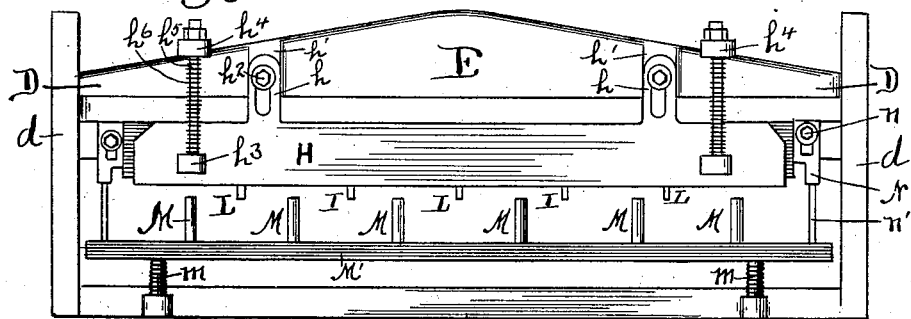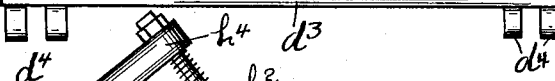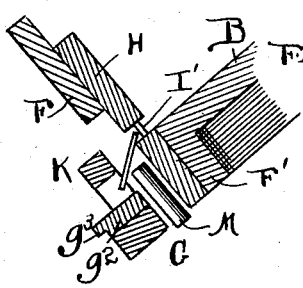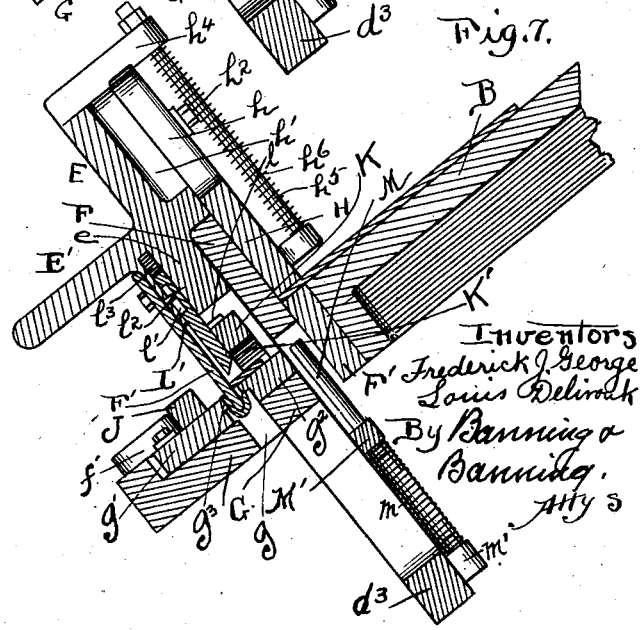

No. 739,841. Patented September 29, 1903.

UNITED STATES PATENT OFFICE.

LOUIS DELIVOUK AND FREDERICK JAMES GEORGE, OF CHICAGO, ILLINOIS.

MACHINE FOR CUTTING AND FORMING BINDING-STRIPS.

SPECIFICATION forming part of Letters Patent No. 739,841, dated September 29, 1903.

Application filed February 9, 1903. Serial No. 142,650. (No model.)

*To all whom it may concern:*

Be it known that we, LOUIS DELIVOUK and FREDERICK JAMES GEORGE, citizens of the United States, residing in Chicago, county of Cook, and State of Illinois, have invented certain new and useful Improvements in Machines for Cutting and Forming Binding-Strips, of which the following is a specification.

The object of this invention is to provide a machine for the purpose of cutting and forming metal binding-strips adapted to protect borders of calendar-cards or similar articles, and the machine is so arranged that the feeding, cutting, and forming of the strips will be entirely automatic and accomplished in a simple, rapid, and perfect manner. The machine is further constructed so that the cutting of one strip and the forming of the next preceding strip will be effected by the same stroke of the operating mechanism, thereby performing the two operations simultaneously and dispensing with separate and distinct devices independently operated for forming the strip after the same has been cut from a sheet of metal.

The invention consists in the features of construction and combination of parts hereinafter described and claimed.

In the drawings, Figure 1 is a top or plan view looking down upon the obliquely-disposed feeding-table; Fig. 2, a front view of the movable frame carrying the knife and forming mechanism; Fig. 3, a view of the forming plate; Fig. 4, a cross-sectional view of the entire device, showing the relative disposition of the various elements; Fig. 5, a rear view of the movable frame of Fig. 2, and Figs. 6, 7, and 8 are detail views of the operative mechanism in different relations; and Figs. 9 and 10 views of a feed mechanism which may be used, if desirable.

The machine is constructed with a frame consisting of two supports A at suitable distances from one another, each support being provided with feet $a$, uprights $a'$, and an obliquely-disposed top rail A', preferably provided with an inwardly-turned flange or ledge $a^2$, upon which is carried an obliquely-disposed feeding-table B, which is held in place on the ledge and regulated thereon by means of set-screws $b$, carried by ears $b'$, (best shown in Fig. 4,) and by means of bolts $b^2$, extending through side walls of the top rail of the frame. Upon the feed-table are arranged a pair of guide-rails B', provided on their exterior with slotted arms $b^3$, through which project screw-threaded bolts $b^4$, threaded into holes $b^5$ in the face of the table, which arrangement enables the guide-rails to be adjusted to accommodate metal plates of varying sizes. At right angles to the top rail of the frame are two guideways C, below which are supporting-arms C', terminating in inwardly-turned ears $c$, through which are screw-threaded bolts $c'$ for the purpose of regulating the mechanism supported by and upon the arms C'. Between the guideways is carried a movable frame D, preferably composed of a single casting, having at its ends slides $d$, operating within the guideways C and regulated therein by means of a set-screw $d'$, contacting a hardened plate $d^2$ within the guideways. Extending between the slides is a lower rail or support $d^3$, provided with ears $d^4$, forming bearings for the driving-rods which actuate the movable frame. Across the top of the frame extends a plate or bar E, at right angles to which is a plate or bar E', below which is a projection $e$, while on the opposite side is a ridge or ledge $e'$. Attached to the upper face of the projection $e$ is a movable cutting-knife or shears F, coacting with a fixed knife or shears F', attached to the forward lower edge of the feed-table, and attached to the lower front face of the projection $e$ and normally projecting slightly below the edge of the movable knife or shears is a forming-plate $F^2$, secured in place by means of bolts $f$ and having the same line of travel as the movable knife, both knife and forming-plate being attached to the same movable frame. Below the knives and having the same angle of inclination as to feed-table is a platen G, having in its body a slot $g$ and being recessed in its upper face to receive the upper and lower platen-plates $g'$ and $g^2$, the latter being preferably adjustable to regulate the width of the slot formed between them. The platen is held in place and regulated by means of set-screws $c'$, heretofore described, although it may be held in place in any desirable manner. The platen-plates, as shown in Figs. 6 and 7, are recessed on their under faces, forming projecting flanges $g^3$, the purpose of which will hereinafter appear.

Contacting with the movable knife or shears is a contact-plate H, provided on its upper edge with slotted arms $h$, which are in alinement with and rest upon ribs $h'$, formed on the face of the movable frame and slidably held in place thereon by means of set-screw-threaded bolts $h^2$, allowing the plate H to travel up and down, its travel being limited only by the length of the slots in the arms $h$. The contacting-bar is provided on its face with recessed ears $h^3$, in alinement with rearwardly-projecting arms $h^4$ on the movable frame, and a rod $h^5$, encircled by a coil-spring $h^6$, extending obliquely downward from the arms into the recessed ears and being fixedly held by the arms, enables the contact-bar to be slid back against the pressure of the springs, thereby changing its position with respect to the cutting-knife with which it cooperates. Within recesses I in the contact-plate are a series of pins I', each provided with an enlarged head $i$, in contact with which is a coil-spring $i'$, regulated by means of an adjusting-screw $i^2$, and these pins are arranged to normally project below the edge of the contact-plate and adapted to be pressed back thereinto against the pressure of the springs when the contact-plate is brought down on the sheet of metal being operated upon.

Upon the face of the lower platen-plate is a forming-stop J, provided with downwardly-projecting slotted arms $j$, through which project screw-threaded bolts $j'$, which enables the adjustment of the forming-stop to meet the requirements of its use. On the opposite side of the slot in the platen is located a cutting-stop K, supported at its ends by angular supports K', terminating in slotted arms $k$, held in position by means of bolts $k'$, which enable the adjustment of the cutting-stop to meet the requirements of its use. Adjacent to the lower side of the cutting-stop is a series of guide-pins L, each provided with a pin $l$, arranged to contact with the upper face of the cutting-stop, and the guide-pins are each provided with a recess $l'$, into which projects a pin $l^2$, and behind the guide-pins and within the recess L' in which they operate are arranged coil-springs $l^3$, which normally tend to hold the guide-pins in the position shown in Fig. 6 below the edge of the forming-plate with the stop-pin $l$ out of contact with the cutting-stop; but as the forming-plate descends the travel of the guide-pins is limited by the stop-pins $l$, so that the forming-plate passes down below the edge of the guide-pins and into the slot between the platen-plates.

Directly below the movable knife or shears is a series of supporting-pins M, carried by a rod or rail M', which latter is supported by means of a coil-spring $m$ upon the lugs $m'$ on the rail $D^3$ of the movable frame. The upper projection of these supporting-pins is limited by the travel of the rod or rail M', so that they never project above the plane of the stationary knife or shears; but on the downward stroke of the movable frame after the tension on the coil-spring has been released the supporting-pins will travel downwardly a suitable distance to bring them below the plane of the platen-plates. The travel of the supporting-pins is regulated by means of slotted fingers N, adjustably held in place on the movable frame by means of screw-threaded bolts $n$, and these fingers are adapted to contact with studs $n'$ on the rod or rail carrying the supporting-fingers, by which arrangement the withdrawal of the supporting-pins may be regulated to begin at the proper time.

The movable frame is operated by means of a rod O, terminating in an eccentric $o$, carried by a shaft O', and, as shown, the shaft is operated by a driving-wheel P, which imparts motion to the shaft through a clutch P' of any suitable construction, which clutch is operated by means of a foot-treadle $P^2$ or by any other suitable means.

It will sometimes be found advantageous to provide a feeding device to aid in discharging the strips of metal after they have been cut, especially the last few strips, which are not readily forced from the cutting-knife by reason of the light weight of the sheet upon them, and, if so desired, the feeding devices illustrated in Figs. 9 and 10 may be employed. This consists of a small contact-plate Q, set edgewise within the guide-rails B', having its projecting end $q$ beveled to form a cam-surface. The contact-plate Q is provided with pins $q'$, operating within slots $q^2$ in the guide-rails, and behind the contact-plate is inserted a coil-spring $q^3$, which normally projects the cam-surface $q$ beyond the end of the guide-rail and in the line of travel of the contact-bar H. To the bottom of the contact-plate is attached a flat thin feed-plate $q^4$, which projects inwardly and forwardly of the guide-rail and over which the sheet of metal travels as it passes down to the cutting-knife. As the contact-plate descends with each stroke it strikes the cam-surface and forces the plate Q and the feed-plate $q^4$ back against the tension of the coil-spring, which position they occupy during the cutting operation. When, however, the strip has been cut and the contact-bar rises, the contact-plate will be released and will fly back into place, together with the feed-plate, forcing the strip off and away from the knives preparatory to permitting the operation. As the sheet is held down the feed-plates, which normally project under the cutting-knife, serve to support and position the advancing sheet until the same has been clamped by the descending contact bar or pins when the feed-plate is forced back out of the way of the knife.

In use the sheet of metal to be operated upon is placed upon the inclined feed-table and slides down by gravity when the movable frame is raised against the cutting-stop, which is adjusted to cut a strip the desired width. As the movable frame descends the contact-bar strikes the sheet of metal and holds it firmly against the lower or fixed knife before the movable knife descends thereon, thereby holding it firmly in place during the cutting or shearing operation. The supporting-pins, which are normally in line with the top of the feed-table and serve to guide the sheet of metal as it slides therefrom into contact with the cutting-stop, retreat as the knife descends and assume the position shown in Fig. 7, allowing the cut strip to pass down under the cutting-stop and under the guide-pins L into place against the forming-stop prior to the descent of the forming-plate. On the next descent of the movable frame the previously-cut strip will be in position against the forming-stop and the sheet of metal on the feed-table will have traveled down under the movable knife and against the cutting-stop, so that with the descent of the frame the strip previously cut will be forced down through the slot between the platen-plates by the forming-plate at the same time that a new strip is being cut from the sheet of metal.

The projecting lips or flanges on the upper platen-plates prevent the formed strip from being withdrawn through the slot and serve to clear the forming-plate for its next succeeding stroke. The cutting-stop may be located to determine the width of strip desired, and the forming-stop may be advanced or withdrawn to regulate the bend or crease desired in the strip, so that the same may be formed to have the crease in the middle or at one side, if so desired.

As the sheet of metal slips down by gravity it will be found that there will be a slight excess of metal, and it is desirable that this excess of metal be left on the last strip rather than cut therefrom, making this last strip too wide rather than too narrow, for the reason that if cut off it might slip down and become clogged in the operating-gear of the machine by reason of its extreme narrowness in comparison with preceding strips. The pins I' in the contact-plate are so arranged that they will contact the sheet of metal after the contact-plate has been withdrawn therefrom by reason of the springs by which they are actuated. If, for instance, the machine is regulated to cut strips a half-inch in width and the last strip of metal is five-eighths of an inch in width and the distance between the pin I' and the lower edge of the contact-plate is one-fourth of an inch, then this last strip of metal, which is five-eighths of an inch in width, will not be contacted by the pins after it has slipped down against the cutting-stop, as shown in Fig. 8, and will fall down and be formed as are the other strips. If, however, the strip be one inch in width, then it will be contacted by the pins and held while the knife descends and cuts the strip into two pieces, each the proper width of one-half inch.

It will thus be seen that the operation of the machine is entirely automatic, that the parts are all adjustable to cut strips of varying widths, and that the arrangement is of simple construction by reason of the fact that a single stroke of the movable frame cuts one strip and simultaneously forms the next preceding strip, obviating the necessity for separate and distinct forming mechanism.

What we regard as new, and desire to secure by Letters Patent, is—

1. In a machine for cutting and forming binding-strips, the combination of a stationary knife, a cutting-knife coacting therewith, a movable frame carrying the cutting-knife, a forming-plate carried by the movable frame, a platen provided with a slot into which the forming-plate is adapted to travel, and means for holding the cut strip over the slot in the platen until the strip is forced thereinto by the forming-plate, substantially as described.

2. In a machine for cutting and forming binding-strips, the combination of a feed-table and movable frame, a movable knife mounted on the frame, a forming-plate mounted on the frame, a fixed knife coöperating with a movable knife, a contact-plate adapted to contact the sheet of metal operated upon during the cutting operation, and a platen provided with a slot into which the forming-plate is adapted to travel, and means for holding the cut strip over the slot in the platen until the strip is forced thereinto by the forming-plate, substantially as described.

3. In a machine for cutting and forming binding-strips, the combination of a feed-table and movable frame, a movable knife mounted on the frame, a forming-plate mounted on the frame, a fixed knife coöperating with a movable knife, a contact-plate adapted to contact the sheet of metal operated upon during the cutting operation, a platen located below the knives and provided with a slot into which the forming-knife is adapted to travel, and a forming-stop on the platen, and means for holding the cut strip over the slot in the platen until the strip is forced thereinto by the forming-plate, substantially as described.

4. In a machine for cutting and forming binding-strips, the combination of an inclined feed-table, a movable frame, a movable knife carried by the movable frame, a contact-bar located in front of the movable knife and normally held below the edge of the knife, but adapted to be forced up under tension above the edge of the knife, a fixed knife coöperating with the movable knife, a forming-plate carried by the movable frame, and a platen provided with a slot into which the forming-plate is adapted to travel, and means for holding the cut strip over the slot in the platen until the strip is forced thereinto by the forming-plate, substantially as described.

5. In a machine for cutting and forming binding-strips, the combination of an inclined feed-table, a movable frame, a movable knife carried by the movable frame, a contact-bar located in front of the movable knife and normally held below the edge of the knife, but adapted to be forced up under tension above the edge of the knife coöperating with the movable knife, a forming-plate carried by the movable frame, a platen provided with a slot into which the forming-plate is adapted to travel, a cutting-stop above the slot, and a forming-stop below the slot, and means for holding the cut strip over the slot in the platen until the strip is forced thereinto by the forming-plate, substantially as described.

6. In a machine for cutting and forming binding-strips, the combination of a movable frame, a movable knife carried by the frame, a fixed knife coöperating therewith, a slidable contact-plate normally held below the edge of the movable knife and in contact with the sheet of metal to be operated upon, a spring for allowing the cutting-knife to pass below the edge of the contact-plate during the cutting operation and be drawn above the edge of the contact-plate for the cutting operation before destroying the contact, and pins normally projecting below the edge of the contact-plate and adapted to be forced back flush with the edge of the contact-plate, substantially as described.

7. In a machine for cutting and forming binding-strips, the combination of an inclined feed-table, a movable frame, a movable knife carried by the frame, a fixed knife with which the movable knife coacts, supporting-pins normally in line with the face of the feed-table and adapted to be withdrawn from such position, an adjustable cutting-stop in line with the top of the feed-table, a forming-plate carried by the movable frame, a platen below the plane of the feed-table and provided with a slot in the line of travel of the forming-plate, and a forming-stop on the platen, substantially as described.

8. In a machine for cutting and forming binding-strips, the combination of a feed-table, a movable frame, a movable knife secured to the movable frame, a fixed knife coacting with the movable knife, a forming-bar secured to the movable frame, guide-pins in front of the forming-bar and normally projecting below the edge thereof, and two plates having between them a slot into which the forming-plate is adapted to descend, substantially as described.

9. In a machine for cutting and forming binding-strips, the combination of an inclined feed-table, a fixed knife or cutter secured to the lower edge of the table, a movable frame slidably mounted within guideways, a movable knife or cutter secured to the movable frame, supporting-pins located below and in line with the movable knife, a cutting-stop in line with the top of the feed-table, a forming-plate carried by the movable frame, and a platen located below the forming-plate and below the plane of the feed-table and provided in its face with a slot into which the forming-plate is adapted to descend, and a forming-stop adjustably mounted on the platen, substantially as described.

10. In a machine for cutting and forming binding-strips, the combination of cutting-knives, a feed-table, guide-rails on the feed-table, a contact-bar operating in conjunction with one of the cutting-knives, contact-plates normally projecting from the ends of the guide-rails into the path of travel of the contact-bar and terminating in cam-surfaces, feed-plates carried by the contact-plates, the feed-plates and contact-plates being forced back by the action of the contact-bar against the cam-surfaces, substantially as described.

LOUIS DELIVOUK.
FREDERICK JAMES GEORGE.

Witnesses:
SAMUEL W. BANNING,
OSCAR W. BOND.